(12) United States Patent
Arnold et al.

(10) Patent No.: US 6,748,233 B1
(45) Date of Patent: Jun. 8, 2004

(54) SYSTEM AND METHOD FOR ENERGY-EFFICIENT TRANSMISSION POWER CONTROL, ROUTING AND TRANSMISSION SCHEDULING IN WIRELESS COMMUNICATION NETWORKS

(75) Inventors: Hamilton W. Arnold, Neptune, NJ (US); Daniel M. Devasirvatham, Lakewood, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 692 days.

(21) Appl. No.: 09/698,972

(22) Filed: Oct. 27, 2000

Related U.S. Application Data

(60) Provisional application No. 60/161,949, filed on Oct. 28, 1999.

(51) Int. Cl.[7] .............................. H04B 7/00; H04Q 7/20
(52) U.S. Cl. .................. 455/522; 455/69; 455/67.11; 455/456.3
(58) Field of Search .................. 455/422.1, 456.3, 455/525, 552.1, 446, 11.1, 522, 67.16, 69, 507, 510, 512, 524, 456.2, 451, 448, 445, 432, 67.11, 62, 67.7, 67.14

(56) References Cited

U.S. PATENT DOCUMENTS

| | | | |
|---|---|---|---|
| 5,410,737 A | 4/1995 | Jones | 455/56.1 |
| 5,450,615 A | 9/1995 | Fortune et al. | 455/67.6 |
| 5,572,221 A | 11/1996 | Marlevi et al. | 342/452 |
| 5,590,133 A | 12/1996 | Billstrom et al. | 370/349 |
| 5,612,948 A * | 3/1997 | Fette et al. | 455/11.1 |
| 5,640,442 A | 6/1997 | Fitzgerald et al. | 379/57 |
| 5,918,176 A | 6/1999 | Arrington et al. | 455/430 |
| 5,943,362 A | 8/1999 | Saito | 375/200 |
| 5,945,948 A | 8/1999 | Buford et al. | 342/457 |
| 6,035,209 A | 3/2000 | Tiedemann et al. | |
| 6,072,784 A | 6/2000 | Agrawal et al. | |
| 6,115,580 A * | 9/2000 | Chuprun et al. | 455/525 |
| 6,400,941 B1 * | 6/2002 | Nara | 455/422.1 |
| 6,490,460 B1 * | 12/2002 | Soliman | 455/522 |

OTHER PUBLICATIONS

K. Paul, et al., "Communications–Aware Mobile Hosts In Ad–hoc Wireless Network," IEEE, 1999, pp. 83–87.
S. Singh, et al., "Power–Aware Routing in Mobile Ad hoc Networks," MOBICOM, 1998, pp. 181–190.
R. Kravets, et al., "Power Aware Communication for Mobile Computers," IEEE, 1999, pp. 64–73.

* cited by examiner

*Primary Examiner*—Nick Corsaro
*Assistant Examiner*—John J Lee
(74) *Attorney, Agent, or Firm*—Joseph Giordano

(57) ABSTRACT

A mobile system capable of proactively predicting characteristics for optimal communication among mobile nodes comprises a network controller and adaptive predictive mobile nodes. The adaptive predictive mobile nodes contain a position location technology element, a database containing information on factors affecting radio propagation, and a prediction processor. To provide energy efficient power control and routing for a communication, the adaptive predictive mobile node determines its current and predicted future position and the current and future predicted positions of other nodes in the network. Based on the information obtained, the adaptive predictive node executes a set of prediction capabilities in the prediction processor. After executing these capabilities, the adaptive predictive node identifies the advantaged location, power level, transmission parameters, communication time and route for communications between nodes. The adaptive predictive mobile node can then communicate when the criteria are met or may request scheduling for the communication based on the criteria. To request scheduling, the adaptive predictive node communicates the identified criteria to the network control entity. The network control entity determines whether the request can be supported. If the network can support the request, the communication is scheduled. If the network cannot support the request, the adaptive predictive node has the option of recalculating the criteria for communication and requesting scheduling based on the alternative criteria.

3 Claims, 5 Drawing Sheets

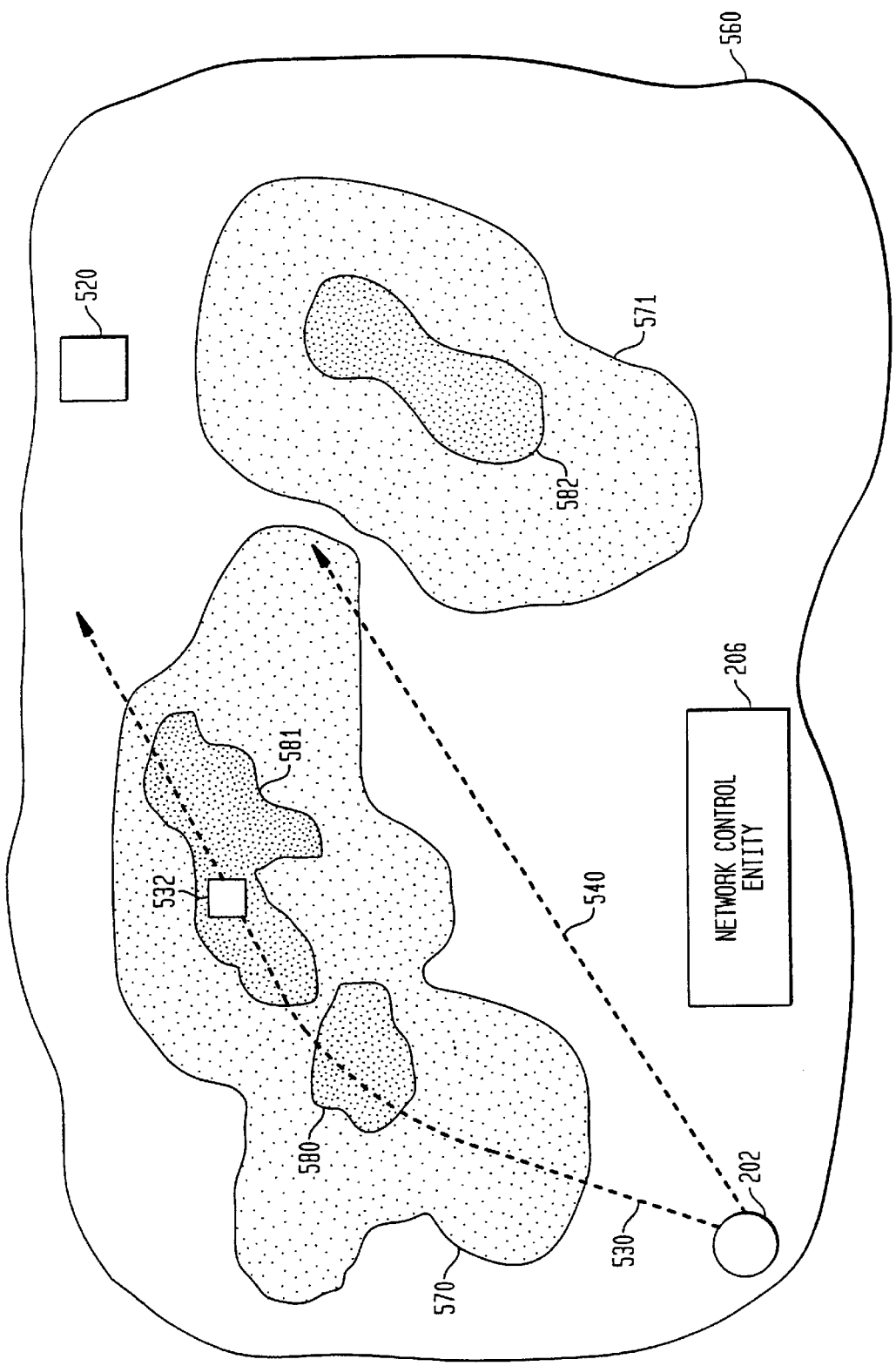

SYSTEM AND METHOD FOR ENERGY-EFFICIENT TRANSMISSION POWER CONTROL, ROUTING AND TRANSMISSION SCHEDULING IN WIRELESS COMMUNICATION NETWORKS

CROSS-REFERENCE TO RELATED APPLICATION

This application claims the benefit of U.S. Provisional Application No. 60/161,949 filed Oct. 28, 1999.

FIELD OF THE INVENTION

This invention relates to wireless communication networks.

BACKGROUND OF THE INVENTION

In recent years, the demand for wireless voice and data services has increased dramatically. In order to keep up with these demands, wireless network providers have focused on methods to increase the capacity of their existing wireless networks while minimizing the energy consumed by small portable devices. Wireless networks, ranging from fixed infrastructure wireless networks such as most of the currently deployed cellular networks to independent, dynamic multi-hop networks, are using various types of power control technology to meet these needs.

A typical fixed infrastructure wireless network 100 is shown in FIG. 1. It is divided into a plurality of cells 124. Each cell contains a fixed base station 126. Each base station 126 is connected to a centralized switch 128 that provides switching capabilities and acts as a gateway to wired networks such as the public switched telephone network (PSTN), the Internet, and other public and private data communications networks. On the customer side, users connect to the wireless network through wireless mobile nodes 122 that can act as transmitters and receivers. The mobile nodes 122 communicate with the base stations 126 over wireless communications links 108.

Dynamic, multi-hop networks consist of a plurality of mobile nodes that can act as transmitters, receivers and message routers and relays. This additional routing capability allows multi-hop routing through intermediate nodes in addition to single hop routing from a source node to a destination node. For example, if propagation characteristics change significantly between a source and destination node, the lowest energy path may be through other intermediate nodes instead of a direct route between the two nodes. Because these networks do not contain fixed base stations, the individual mobile nodes communicate with each other over wireless communications links. This network structure allows the mobile nodes to move freely, generating rapidly changing network topologies.

Dynamic, multi-hop networks may also contain a plurality of mobile hub nodes. These mobile hubs act as traffic concentrators similar to base stations in a typical fixed mobile network except these hubs are capable of limited mobility. Dynamic, multi-hop networks containing mobile hubs can be considered hybrid networks because they combine characteristics of dynamic networks and fixed infrastructure networks.

In nearly all types of wireless networks, power requirements and optimal transmission parameters for communication over wireless links can vary greatly even over distances of 100 feet or less because of natural and cultural features such as hills, trees, and buildings. For example, a mobile node may need to increase transmitted power to maintain reliable communications when traveling behind a building or through a heavily forested area. The mobile node may also benefit from adapting its transmission parameters (e.g., modulation, demodulation, and error control coding) to changing channel characteristics. The use of significantly inappropriate transmission parameters would likely require a further increase in transmitted power to maintain reliable communications. In addition, a mobile node may need to increase power and further adapt its transmission parameters to ensure reliable communication of data as its transmitted data rate increases.

When a mobile node increases power, interference with other mobile nodes may also be increased. The channel capacity of a wireless network is greatly influenced by this co-channel interference. An increase in interference between users can lower the ability of a wireless provider to reuse frequencies, resulting in a reduction of system capacity. Because of the tremendous demand for wireless voice and data services and increased competition between service providers, wireless network providers cannot afford such a reduction in system capacity. Therefore, wireless providers are continually striving to maximize system capacity, which in turn, requires limiting co-channel interference.

Prior techniques addressing efficient power control and transmission parameter adaptation in wireless networks use knowledge gained from past network and link measurements. For example, fixed infrastructure Code Division Multiple Access (CDMA) networks can use both open-loop and closed loop methods to provide power control. In open-loop power control, a transmitting mobile node estimates a transmission power based on measurements of the power level of signals received from the base station. In closed-loop power control, a receiving node (e.g., a base station) measures power level received from a transmitting node (e.g., mobile node). The receiving node determines whether the measured power is within a pre-defined power level. Based on these measurements taken by the receiving node, the receiving node periodically communicates power control commands to the transmitting node (e.g., decrease power, increase power).

For optimal power control and transmission parameter adaptation, these prior techniques require a mobile node to be in continuous or nearly continuous two-way communication with other nodes to obtain measurement of the characteristics of all potential paths. When two mobile nodes are in continuous communication, they can exchange information on received signal power and signal quality and each mobile node can adjust its transmitter power and adapt its transmission parameters to expend the minimum energy needed to maintain communication as the propagation environment between them changes. If the characteristics of the propagation paths between mobile nodes are known through continuous use of the paths, rerouting decisions in a multi-hop network can also be made optimally to minimize overall energy.

If, however, use of a particular link is sporadic, measurements of that path can become outdated and power control, transmission parameter adaptation, and routing would then be based on out-of-date information. If the new transmission is begun at too low a transmitted power or with inappropriate transmission parameters, it will not succeed and must be repeated at a higher power. If it is begun at too high a transmitted power, it will succeed but will expend excess energy. If the choice of a new route does not adequately reflect the actual path loss, additional energy may be expended transmitting information over inferior routes.

An objective of our invention is to provide a system and method that will proactively predict optimal communications characteristics (e.g., power level, transmission parameters, communication time and location) without relying on prior network measurements. It is yet another objective of our invention to provide a system and method with future advanced reservation capabilities that will allow the scheduling of future transmission at the optimal communication time and place.

It is a further objective of our invention to provide a system and method that will provide efficient power control and transmission parameter adaptation at a mobile node, thus reducing the drain on the mobile node's battery power and decreasing the energy radiating from a mobile node's antenna to accomplish a desired communication.

SUMMARY OF THE INVENTION

Our invention is directed to energy efficient power control, transmission parameter adaptation, routing, and scheduling in a wireless network. Our invention provides a wireless system that proactively predicts optimal characteristics such as power level, transmission parameters, transmission location, and time for communication between two nodes. The wireless system includes adaptive predictive mobile nodes and an autonomous or distributed network controller. In addition, the wireless system may also include traditional nodes such as handsets, mobile computers, and fixed base stations. The adaptive predictive mobile nodes include a position location technology element, a database, and a prediction processor. The prediction processor includes capabilities to predict the advantaged location, power level, transmission parameters, communication time, and route for communications between nodes.

In the first mode of operation of our invention, the wireless network uses the adaptive predictive capabilities of mobile nodes and the supporting capabilities distributed throughout other network nodes to provide energy efficient power control, transmission parameter adaptation, and routing for communications between nodes. In this mode, the adaptive predictive mobile node determines its current and predicted future position, the current and future predicted positions of other nodes in the network, and the priority of the data to be communicated. The adaptive predictive mobile node then executes the propagation prediction and power level prediction capabilities in the prediction processor. After executing these capabilities, the adaptive predictive node identifies an advantaged position, power level, and set of transmission parameters for communication with another node. This communication could comprise data transmission or data reception. In addition, the adaptive predictive mobile node may execute a communication time prediction capability and identify the most advantaged time for communication at the selected location based on future predicted node locations. For systems with advanced routing capabilities located in individual nodes such as ad hoc multi-hop networks or hybrid networks, the adaptive predictive node may also execute a route prediction capability and identify the most advantaged route for present or future communication. The adaptive predictive mobile node then communicates based on the identified criteria.

In a second mode of operation, an adaptive predictive node can schedule communication with another node through communications with the autonomous or distributed network control entity. The addition of scheduling to the efficient power control and routing provides an additional level of reliability for communicating nodes. In this mode, the adaptive predictive node identifies optimal characteristics for communication as described above in the first mode of operation (e.g., location, power level, transmission parameters, communication time, and route.) Instead of communicating only when the criteria are met, the adaptive predictive mobile node communicates a request for scheduling based on the criteria to the network control entity. The network control entity determines whether the network can support the scheduling request and communicates the determination to the adaptive predictive node. If the request can be supported successfully, the node will communicate based on the criteria. If the request cannot be supported successfully, the node may identify alternative criteria and communicate another scheduling request to the network control entity.

BRIEF DESCRIPTION OF THE DRAWINGS

FIG. 5 depicts a network environment for the specific illustrative embodiment of our wireless network.

DETAILED DESCRIPTION OF PREFERRED EMBODIMENTS

Figure 1:
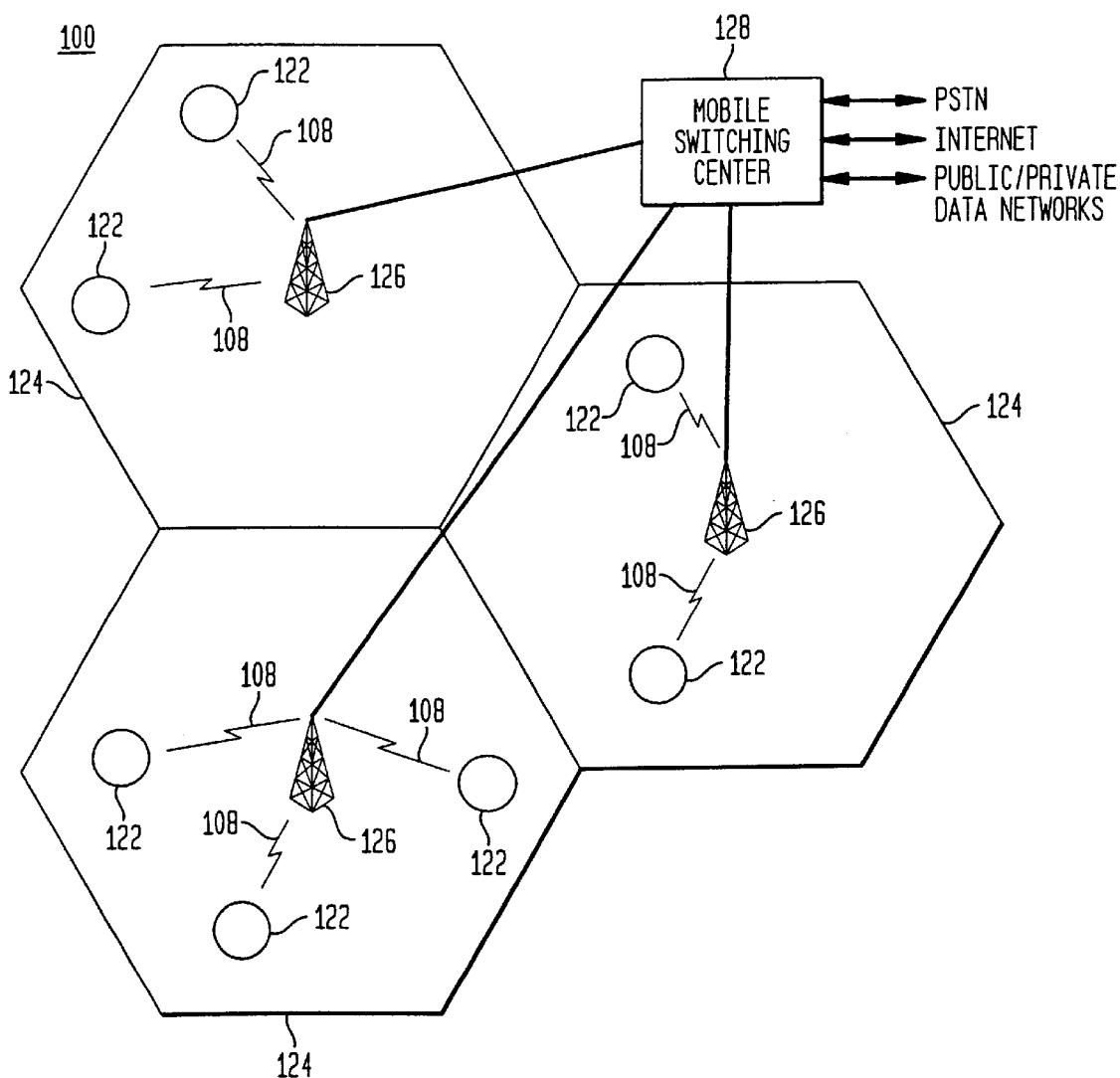
FIG. 1 is a network diagram illustrating a typical fixed infrastructure wireless network.
Figure 2:
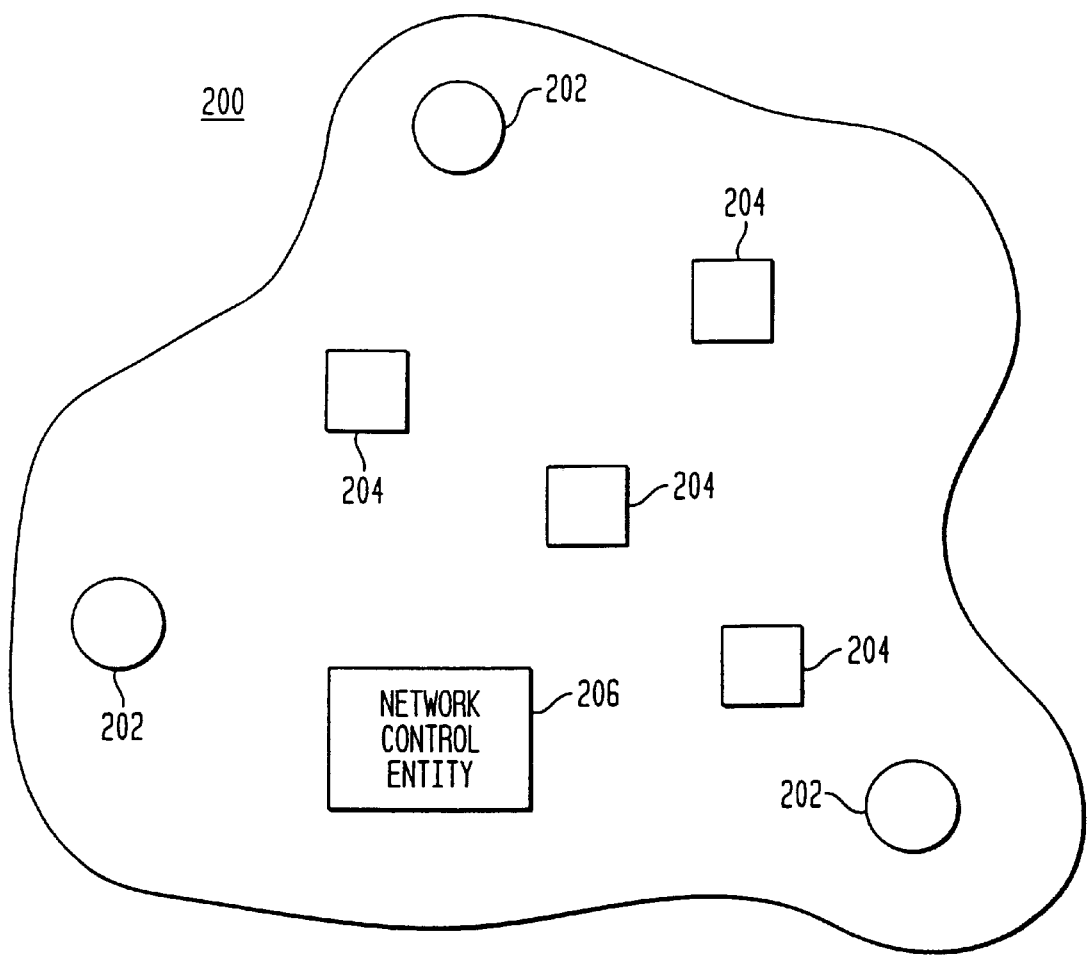
FIG. 2 is a network diagram of an illustrative embodiment of a wireless network in accordance with our invention.

FIG. 2 depicts a wireless network 200 according to a specific illustrative embodiment of the invention. This network can be a fixed infrastructure network, a dynamic multi-hop network, or a hybrid network containing characteristics of both a fixed and dynamic network. The illustrative wireless network of FIG. 2 comprises one or more mobile nodes 202, each with adaptive predictive communications capabilities, a plurality of nodes 204 capable of transmitting and receiving mobile communications, and a network control entity 206. Each adaptive predictive mobile node 202 communicates with other nodes 202 and 204 via wireless communications links. In a particular system, the nodes 204 may be traditional wireless nodes such as handsets or mobile computers, stationary base stations, or mobile hub nodes. The nodes 204 communicate with other mobile nodes 204 through wireless communications links or through wired links (e.g., base station to base station communication). In multi-hop and hybrid networks, the nodes 202 and 204 may also have routing capabilities.

The network control entity 206 may be located on a single platform or its function may be distributed on a plurality of mobile nodes in accordance with a prior agreed upon network traffic control policy.

Figure 3:
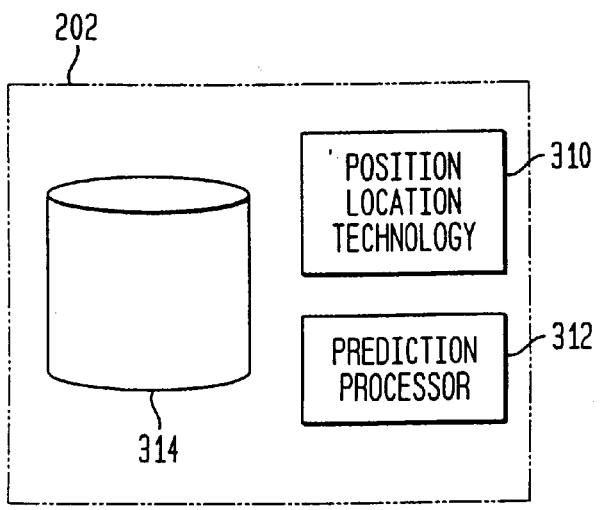
FIG. 3 depicts an illustrative adaptive predictive mobile node for the network of FIG. 2.

FIG. 3 is a block diagram of an adaptive predictive mobile unit 202, in accordance with the invention. Adaptive predictive mobile unit 202 includes a position location technology element 310, a prediction processor 312, and a database 314. The prediction processor 312 may contain propagation, communication time, power level, transmission parameter, and routing prediction capabilities. Database 314 contains information on factors that affect radio propagation (e.g., terrain, foliage, and cultural features) in a predetermined geographic area. Database 314 may also contain information on the current and predicted future locations of other mobile nodes. The position location technology element 310 in the adaptive predictive mobile node 202 is advantageously a global positioning system (GPS).

Figure 4A:
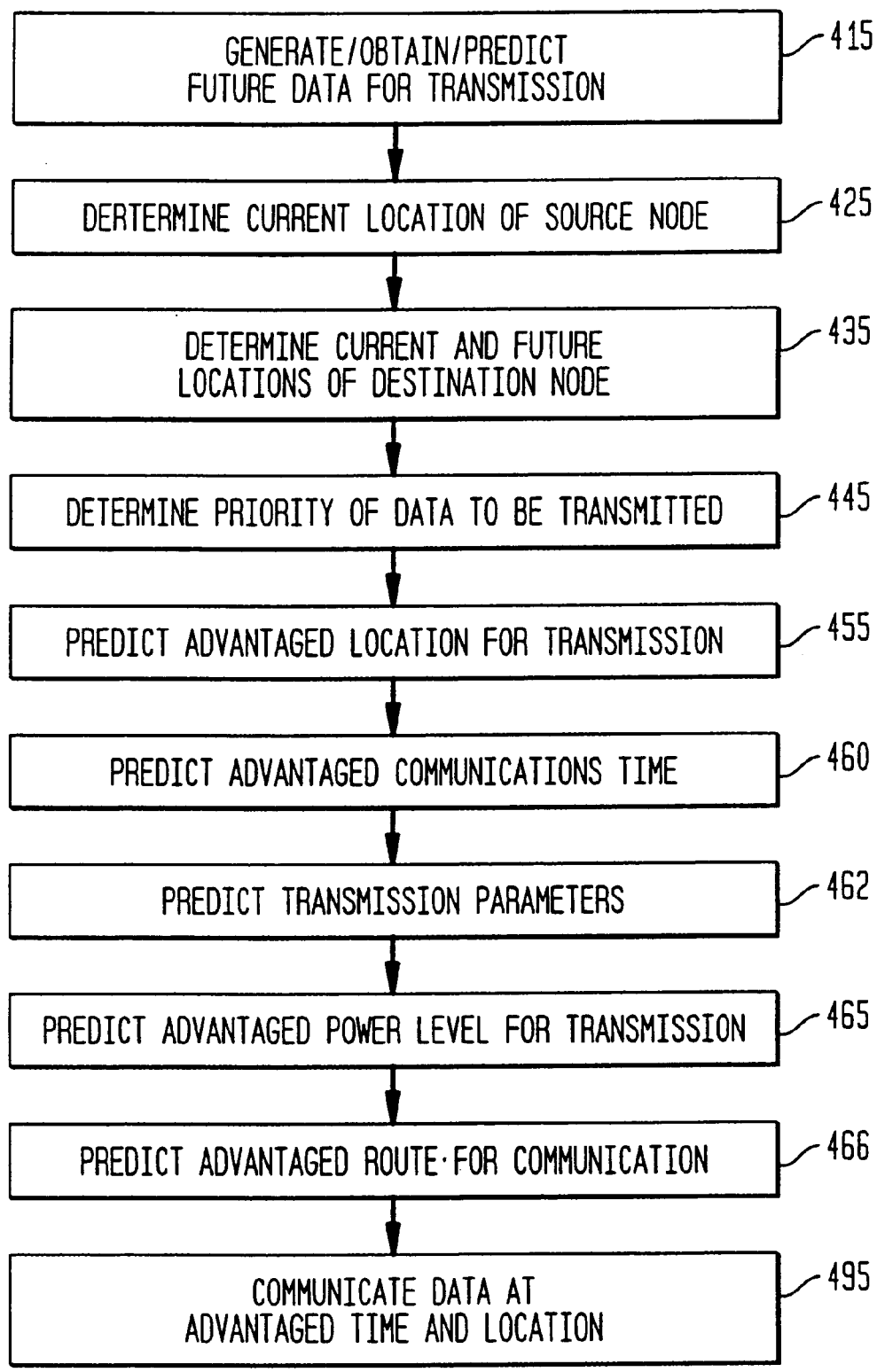
FIG. 4a is a flow diagram illustrating a method of providing efficient power control, transmission parameter adaptation, and routing.

An illustrative method of a first mode of operation in accordance with our invention is set forth in FIG. 4A. The method begins at step 415 when adaptive predictive mobile node 202 generates, obtains, or predicts that it will have data for transmission. Alternatively, in this step, the adaptive predictive mobile node 202 may predict that it will have a need to receive data. Steps 425 through 445 describe the necessary steps for gathering of information necessary as input to the prediction processor 312. These steps can be preformed in any order.

At step 425, the adaptive predictive mobile node 202 calculates its current position using the position location technology element 310. The adaptive predictive mobile node 202 must also determine the current and future locations of a target node in step 435. The target node can be another mobile node, a fixed base station, a hub mobile node having base station-like capabilities, or any communication device capable of receiving the transmission. For data transmission by the adaptive predictive mobile node 202, the target node will be a destination node for the transmission. For data reception by the adaptive predictive mobile node 202, the target node will be an origination node.

To make the location determination, the adaptive predictive mobile node 202 obtains a future node motion profile for the destination node stored in the database 314. The future node motion profile is a profile detailing the planned or predicted trajectory of a mobile node. This information can be updated at any time and stored in database 314 of the adaptive predictive node 202. In addition, the future node motion profile may have been obtained through previous communication with the node.

In an alternate embodiment, the adaptive predictive mobile node 202 obtains the current location of the target node over the wireless link. That is, the target node may broadcast its current location and planned trajectory periodically (e.g., every 60 seconds) or may respond to a location query from the adaptive predictive mobile node 202. Based on this information and knowledge of previous velocity and trajectory, the adaptive predictive mobile node 202 can estimate the future locations of the target node.

At step 445, the adaptive predictive mobile node identifies the delivery priority, if any, of the data to be transmitted. For example, not all messages to and from a mobile node will have equal message delivery priority. Some urgent messages will require immediate delivery, while others can tolerate significant delivery delay. The maximum delivery delay that can be tolerated sets the time constraints for data delivery.

After the necessary input information is obtained and sent to the prediction processor 312, the adaptive predictive mobile node 202 determines the advantaged location, communication time, transmission parameters, and power level for transmission or reception. Steps 455 through 466, describing the prediction processes, can be performed in any order. To identify an advantaged location for communication, the adaptive predictive mobile node 202 performs propagation prediction in the prediction processor 312 (step 455). The propagation prediction capability determines the character of present and future paths between the adaptive predictive node 202 and the target node based on the current and anticipated future positions of the adaptive predictive node 202 and the target node. More than one possible future motion profile may exist for a given adaptive predictive node 202. If this occurs, the prediction processor 312 may recommend to the user of the adaptive predictive node 202 that a particular future motion profile be followed to go by the most advantaged location for communication at the most advantaged time.

The propagation prediction capability of the prediction processor 312 may be based on any existing or future radio channel prediction algorithm. The function of this algorithm is to predict the transmission characteristics of the radio path between two nodes based on the topography and the natural and cultural features of the geographic area such as trees and buildings. Examples of such algorithms include the TIREM (Terrain Integrated Rough Earth Model) and Longley-Rice algorithms, which include only topographic features, and ray-tracing algorithms that also incorporate buildings. Existing and future algorithms, which also include the effects of foliage, may advantageously be incorporated into the prediction processor within the scope of this invention.

In addition, the adaptive predictive node 202 also predicts the advantaged communication time, transmission parameters, and power level for communication (steps 460, 462, and 465) using capabilities in the prediction processor. For networks with advanced routing capabilities located in individual nodes such as multi-hop and hybrid networks, the adaptive predictive mobile node may also predict an advantaged route through the network that best meets the latency and energy constraints for the communications link or for the overall network (step 466). This routing prediction can be performed autonomously by the adaptive predictive mobile node 202 or through communication with a network control entity 206.

In this first mode of operation for data transmission, the adaptive predictive mobile node 202 attempts transmission when it reaches the determined advantaged location and time (step 495) using the predicted transmitted power and transmission parameters. Alternatively, for data reception, the adaptive predictive mobile node 202 attempts to receive data at the determined advantaged location and time (step 495). The calculated advantaged criteria represent the position and time for communication with the highest probability of success using the lowest transmitted energy and meeting the time constraints for data delivery. The most advantaged position and time could be the present time and position or some position in the future.

Figure 4B:
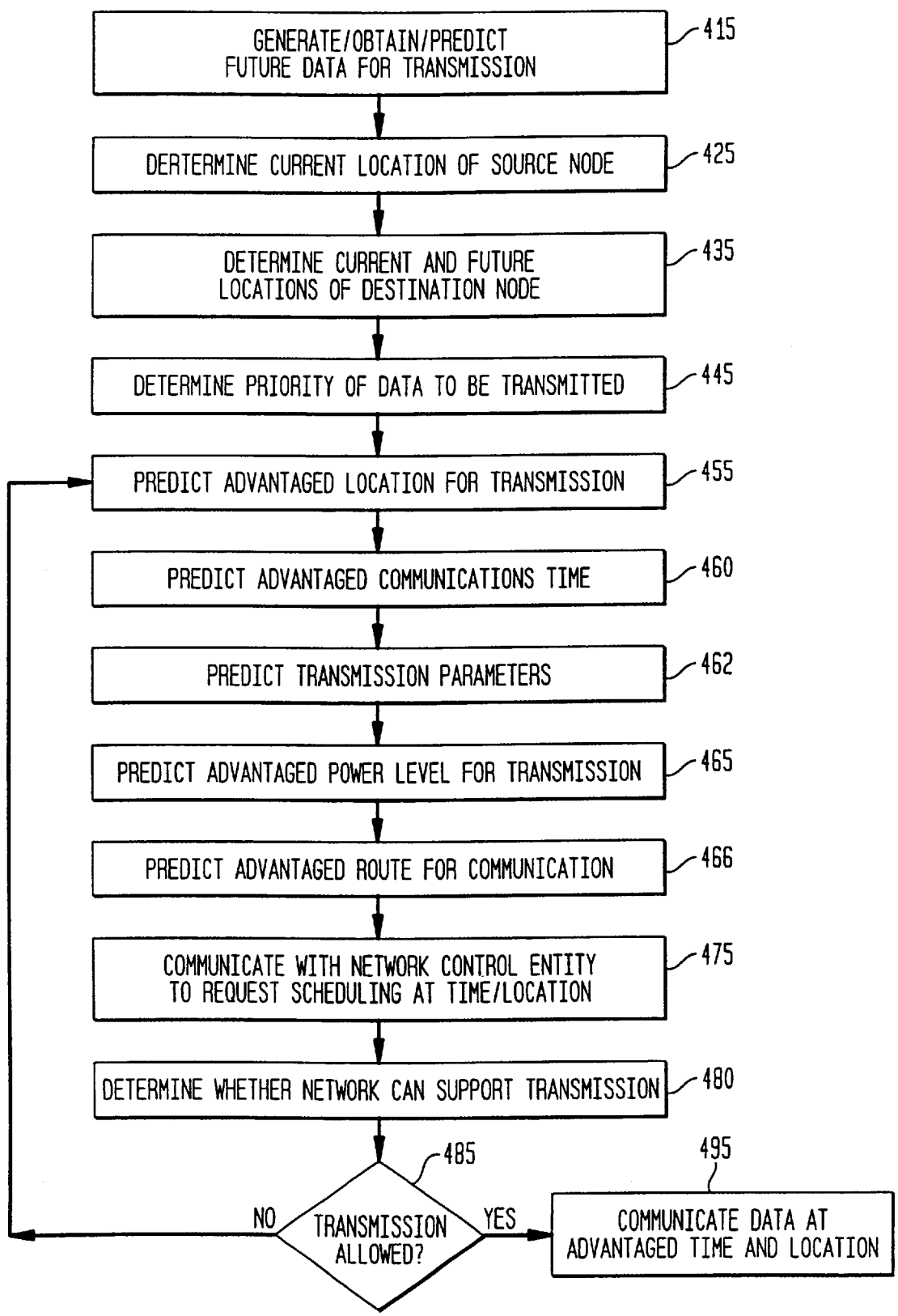
FIG. 4b is a flow diagram illustrating a method of providing efficient power control, transmission parameter adaptation, routing, and scheduling.

An illustrative method of a second mode of operation in accordance with our invention is set forth in FIG. 4B. In this mode of operation, steps 415 through 466 are identical to those described above. However, after the adaptive predictive mobile node 202 determines the advantaged position, communication time, transmission parameters, and power level for transmission, the node 202 communicates with a network control entity 206 for the wireless network to request scheduling at the determined advantaged time and place for the bandwidth and duration required (step 475). In certain network configurations such as multi-hop or hybrid networks, the network control entity 206 may be distributed among all nodes. In response to this request, at step 480, the network control entity 206 determines whether the network can support the scheduling request based on the network's current and anticipated traffic load and other received reservations.

If the network can support the bandwidth and duration of the transmission at the requested position and time, at step 485, the network control entity 206 communicates to the adaptive predictive mobile node 202 and all other nodes involved in the transmission that the bandwidth is reserved for the scheduled position, time, and duration. In this mode of operation, the adaptive predictive mobile node 202 then transmits when it reaches the scheduled position and time (step 495). To aid transmission, the network control entity 206 can also make a directive to other network nodes to cease or restrict transmission at the time reserved.

If the network cannot support the bandwidth and duration of the transmission at the requested position and time, at step 485, the network control entity 206 communicates to the adaptive predictive mobile node 202 that the request for transmission at the determined position and time has been denied. The process then returns to step 455 and the adaptive predictive mobile node 202 determines another advantaged position, time, and set of parameters for transmission. At step 475, the adaptive predictive mobile node 202 communicates to the network control entity 206 the alternate position, communication time, and transmission parameters.

The network control entity 206 then determines whether to schedule the transmission at the requested position and time (step 480). The network control entity 206 communicates the decision to the adaptive predictive mobile node 202 and to all other nodes involved in the transmission, as before.

For example, assume that in the illustrative environment shown in FIG. 5 adaptive predictive mobile node 202 has a need to transmit 10 Mb of data within 3 minutes to destination node 520. Destination node 520 could be a node with adaptive predictive capabilities 202 or a traditional node 204 capable of transmitting and receiving. The adaptive predictive mobile node 202 determines that the area numbered 560 represents an area with a low probability of successful communications, the areas numbered 570 and 571 represent areas with a medium probability of successful communications, and the areas numbered 580, 581, and 582 represent areas with a high probability of successful communications. Mobile node 202 has a choice of two paths, path 530 and 540. Based on the results of the propagation prediction algorithm, adaptive predictive mobile node 202 determines that path 530 offers the best route for transmission purposes and position 532 represents an advantaged position along path 530 for the transmission.

If the adaptive predictive mobile node 202 is operating in the first mode of operation described above, the node 202 recommends to the user that path 530 be followed and attempts transmission at location 532 at the determined time T1 using the predicted amount of transmission power and the predicted transmission parameters. If the adaptive predictive mobile 202 is operating in the second mode of operation, the node 202 recommends to the user that path 530 be followed and requests scheduling for transmission of 10 Mb of data at position 532 and time T1, provided that T1 is within 3 minutes of the present time. In response to this request, the network control entity 206 determines whether the network can support the scheduling request. If the network can support the request, the network control entity 206 communicates to the adaptive predictive mobile node 202 that 10 Mb of bandwidth is reserved for position 532 at time T1.

The previously described embodiments of our invention have many advantages including proactively predicting the wireless channel propagation conditions and resulting link states without relying on prior measurements. This prediction of path loss and other channel characteristics can maximize a moving node's ability to use the minimum energy when communicating sporadic packets of information to other nodes in the network and can also maximize the probability of successful transmission of such information packets.

Although the invention has been shown and described with respect to exemplary embodiments thereof, it should be understood by those skilled in the art that various changes, omissions and additions may be therein and thereto, without departing from the spirit and the scope of the invention.

What is claimed is:

1. An adaptive predictive mobile node for energy efficient transmission power control in a wireless communication network, said node comprising:

a position location technology element;

a database containing information on factors affecting radio propagation in the geographic areas in which the adaptive predictive mobile node and neighboring nodes are located; and a prediction processor, said prediction processor including a location prediction capability, a transmitted power level prediction capability, and a communication time prediction capability, whereby said prediction processor estimates the future locations of other mobile nodes in the network, an advantaged location and power level for communication, and an advantaged future time for communication.

2. A method for energy-efficient power control and routing in a wireless communication network including a plurality of mobile nodes, said method comprising the steps of:

calculating in a first mobile node, the current position of said first mobile node;

determining, in said first mobile node, the current and future positions of other of said nodes;

executing, in a processor in said first mobile node, (1) a propagation prediction capability, wherein said prediction capability performs the step of predicting the transmission characteristics between said first mobile node and another of said nodes, (2) a transmission power level prediction capability, and (3) a communicating time prediction capability;

identifying an advantaged location, transmitted power level, and future time for communication between said first mobile node and another of said mobile nodes; and in response to said identifying step, communicating data between said first mobile node and said another mobile node.

3. A method for energy-efficient power control, routing and scheduling in a wireless communication network including a plurality of mobile nodes and a network controller, said method comprising the steps of:

calculating, in a first mobile node, the current position of said first mobile node;

determining, in said first mobile node, the current and future positions of other of said nodes and the priority of data to be communicated;

executing, in a processor in said first mobile node, a propagation prediction capability, a transmitted power level prediction capability, and a future communication time prediction capability;

identifying an advantaged position, transmitted power level, and future time for communication between said first mobile node and another of sad mobile nodes;

communicating a request for scheduling of transmission at said advantaged position and future time from said first mobile node to said network control entity;

determining, in said network control entity, whether the network can support said scheduling request at said future time; and communicating said determination from said network control entity to said first mobile node.

* * * * *